Sept. 28, 1954  R. A. PENNEMAN  2,690,378
MANUFACTURE OF HYDRAZINE
Filed Oct. 15, 1948
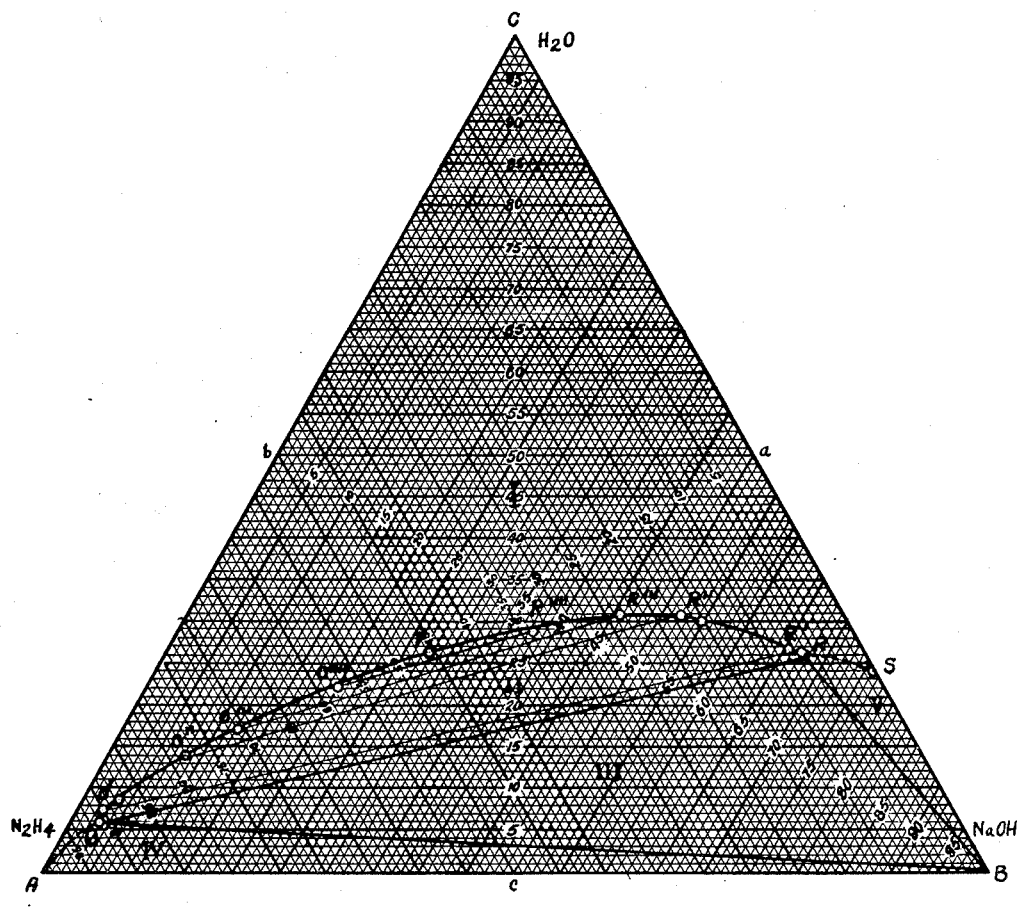
INVENTOR:
ROBERT ALLEN PENNEMAN
BY Bruinga and Sutherland
ATTORNEYS.

UNITED STATES PATENT OFFICE 2,690,378

MANUFACTURE OF HYDRAZINE

Robert Allen Penneman, Los Alamos, N. Mex., assignor to Olin Industries, Inc., East Alton, Ill., a corporation of Delaware Application October 15, 1948, Serial No. 54,707

6 Claims. (Cl. 23—190)

This invention relates to the preparation of substantially anhydrous hydrazine. By substantially anhydrous hydrazine is meant a product containing at least 95% hydrazine by weight.

The usual methods for synthesis of hydrazine yield very dilute aqueous solutions of hydrazine hydrate. The concentration of hydrazine hydrate in this solution can readily be increased to strengths in the range of 80% to 100% hydrazine hydrate by fractional distillation. Such hydrazine hydrate solutions correspond to a hydrazine content of 51% to 64%, respectively. Since hydrazine and water form a constant boiling mixture, composed of hydrazine hydrate and a small amount of hydrazine with a maximum boiling point of 120° C. at 765.5 mm. pressure, it is not possible by processes of ordinary fractional distillation to remove the water still present in order to achieve a product of higher than about 70% hydrazine content.

Methods used heretofore for producing anhydrous hydrazine have, therefore, involved the dehydration of such concentrated hydrazine hydrate solutions by making use of such agents as the hydroxides of the alkali metals, the oxides of calcium and barium, and sodium amide. Attempts to prepare anhydrous hydrazine involving reaction of hydrazine hydrochloride with an alkali metal alcoholate in absolute alcoholic medium, followed by removal of the precipitated alkali metal chloride, and subsequently separation of the alcohol-hydrazine solutions by distillation have also been disclosed. Furthermore, it has been disclosed that certain hydrazine salts undergo ammonolysis in liquid ammonia and yield by such a process solutions of hydrazine in liquid ammonia.

In describing methods involving the use of inorganic oxides or hydroxides for dehydration of hydrazine hydrate, it is stated in the literature that long refluxing is necessary to achieve homogeneity before distillation and separation of the hydrazine can be effected. For instance, Raschig, Ber. 43, 1927 (1910), states that it is necessary to reflux over solid sodium hydroxide for several hours, followed by distillation at 140–150° before a substantially water-free product can be obtained. Stähler, Ber. 42, 3018 (1909), treats hydrazine hydrate with calicum oxide, but finds that distillution under normal pressure requires such a high temperature that considerable decomposition of hydrazine is thereby brought about with consequent hydrazine losses and contamination. Wenner and Beckman, J. Am. Chem. Soc., 54, 2787 (1932), insist that it is necessary to distil over fused potassium hydroxide. While barium oxide seems to be an effective dehydrating agent, excessive quantities of this material are needed, with the result that distillation must be effected from a heterogeneous mass through which heat transfer is very poor, thus leading to local overheating and danger of violent decomposition. Hale and Shetterly, Journal of American Chemical Society 33, 1071 (1911), used 415 g. of crushed barium oxide to effect dehydration of 150 g. of hydrazine hydrate. It is significant that all previous investigators experienced difficulty in the preparation of substantially anhydrous hydrazine; and all found it necessary to concentrate the crude solutions until they were nearly 100% hydrazine hydrate before contacting them with the dehydrating agent selected.

Thus, a number of methods have been proposed in the literature, each of which is subject to serious disadvantages. It is the object of this invention to provide a new method for preparing substantially anhydrous hydrazine which does not suffer from the disadvantages that characterize the prior methods. Another object is to provide a simple and economical method for producing substantially anhydrous hydrazine. Still another object is to provide a novel process for producing economically substantially anhydrous hydrazine from hydrazine solutions containing as little as 35% hydrazine hydrate. Other objects and advantages will become apparent from the following detailed description of the invention.

In accordance with this invention, substantially anhydrous hydrazine may be directly recovered from dilute solutions of hydrazine hydrate by contacting the latter with sodium hydroxide in proportions such that there is approximately one mole of sodium hydroxide for each mole of water desired to be separated from the hydrazine in the hydrate solution. The invention is predicated upon the discovery that at temperatures between 60 and 100° C., such mixtures exhibit a phenomenon of limited liquid miscibility and, absent vigorous agitation, will stratify so as to yield an upper liquid layer containing nearly all the hydrazine and little else. This upper hydrazine-rich layer may be separated from the balance of the mixture by siphoning, decantation, or distillation under reduced pressure.

It is preferred to limit the amount of sodium hydroxide utilized to but slight excesses over the one-to-one mole ratio with the water present.

Such limitation eliminates the possiblity of an incompletely liquid system, although it is recognized that in some situations the presence of a small amount of a solid phase may be tolerated. Large excesses of sodium hydroxide result in a large quantity of solid phase, which may interfere with the concentration operation and is therefore to be avoided. The excess which may be present before a solid phase appears depends upon the temperature of treatment. For example, at 70° C. with sodium hydroxide content of 50%, the system is completely liquid with a water content above 20%, but below 20% water a (third) solid phase is present. For practical and efficient manipulation the molecular ratio of caustic to water should never exceed about 2 to 1. At the other extreme, with a sodium hydroxide content of 50% and more than 31% water, there is but one liquid phase.

In the practice of the present invention, the hydrazine hydrate solution of known water content, is mixed quickly with the requisite amount of sodium hydroxide, immediately connected with a distillation apparatus and the system partially evacuated, to for example 90 mm. of mercury. The heat of reaction plus some extrinsic heat will raise the temperature sufficiently to begin immediate distillation of the hydrazine-rich phase at 61–62° C. If it is desired to separate the hydrazine-rich phase mechanically, the pressure is maintained high enough to prevent distillation but maintain a temperature of at least 60° C., until the mixture becomes quiescent or nearly so.

The use of equi-molar proportions of sodium hydroxide to water present in any crude hydrazine hydrate solution, regardless of concentration of hydrazine hydrate within practical limits, produces a solution within which the partial pressure of water is reduced to a very small value, thus permitting the removal of the hydrazine-rich phase from such solutions effectively as a water-free vapor without previous mechanical separation of the hydrazine-lean phase.

Contrary to prior teachings, the present invention renders it unnecessary to start with a hydrazine hydrate containing nearly 100% $N_2H_4.H_2O$. Excellent results have been achieved with substantially quantitative recovery of hydrazine from dilute solutions containing as little as 35% hydrazine hydrate ($N_2H_4.H_2O$).

Furthermore, it has been found unnecessary to previously fuse the sodium hydroxide as indicated by earlier investigators, provided due allowance is made for the water content of commercial or technical caustic soda. It is obviously advantageous to use commercial or technical grades, because of their lower cost.

The sodium hydroxide monohydrate which is formed as the result of the hydrazine dehydrating reaction, and which largely constitutes the lower layer of the mixture, has a melting point of 64.3° C., and this monohydrate has a vapor pressure of only 0.3 mm. at its melting point.

While the limited liquid miscibility phenomenon exists throughout the 60 to 100° C. bracket of temperatures, it is advantageous to confine the distillation temperatures to between 60 and 80°. The characteristics and relative compositions of the respective phases vary somewhat with the temperature, but the hydrazine content of the hydrazine-rich phase contains better than about 83% hydrazine at temperatures above 70° C. (77.5% at 60° C.). Between 60° C. and 100° C. (with mixtures containing over about 85% hydrazine hydrate) more than 75% of the total hydrazine content is contained within the hydrazine-rich phase. The lower layer, i. e., the hydrazine-lean phase, consists mostly of sodium hydroxide monohydrate, with only 6.7% of hydrazine at a temperature of 70° C. (19% hydrazine at 60° C.). Elevation of the temperature above 70° C. does not markedly increase the hydrazine content of the hydrazine-rich phase, however. The accompanying drawing, which is a triangular diagram depicting the characteristics of the system $N_2H_4 \cdot H_2O$—$NaOH$ at 70° C. indicates the proportions of the several constituents which exhibit the limited liquid miscibility phenomenon. In the diagram, the letters A, B and C designate the apexes of the triangle, and for convenience the opposite bases are designated $a$, $b$, and $c$ respectively. The area designated I and bounded by the lines AC, CS and SPA, represents all compositions forming a one phase liquid system. The area II, bounded by the lines OR and RPO, represents all compositions composed of two liquid phases. Area III, bounded by the lines OR, RB, and BO, represents all compositions having two liquid phases and one solid phase. Area IV, bounded by the lines AOB, and AB, and area V, bounded by the lines BSR and BR, represent systems having only one liquid phase and one solid phase.

Area II represents the compositions which are preferred. Highest concentrations of hydrazine in the upper hydrazine-rich phase will be obtained by employing weights of materials lying along the line OR. With the upper hydrazine-rich layer having a composition represented by the point 0 and the lower sodium hydroxide monohydrate-rich layer having a composition as indicated by the point R. Similarly the proportions of the mixture in the upper and lower phases for compositions along the line OR can be determined very simply by employing the well-known lever principle. If less alkali is used, then compositions of conjugate liquid phases will be given by the family of tie lines such as O'R', O"R", etc. To insure separation into phases with the limiting compositions represented by the points O and R caustic soda should be added so that a slight excess is present to insure that equilibrium is established. However, the addition of more caustic to the system than is represented by the line OR, in order to bring the composition into the area III, does not enrich the hydrazine concentration of the upper liquid phase, so that only very slight excess of caustic need be employed to insure rapid equilibrium conditions represented by the line OR.

Several specific examples of the process will now be given. Quantities are in parts by weight.

*Example I*

To 366 parts of aqueous hydrazine hydrate containing 85.5% by weight of hydrazine hydrate, or 200 parts by weight of hydrazine, in a suitable distilling vessel there were added 471 parts of 97% caustic soda equivalent to 457 parts of 100% caustic soda. The caustic to water molecular ratio was thus about 1.21. The addition of caustic soda was accompanied by a rise in temperature as solution took place and additional heat was applied to bring the temperature of the mixture quickly to 62° C., giving a completely liquid mass in the distilling vessel. Pressure in the vessel was reduced to approximately 94 mm. and the resultant vapor condensed in a suitable receiver. A temperature of 62° C. was maintained in the distilling vessel until no further distillate went into the receiver and there were obtained 107.4 parts of a product containing approximately 98.4% $N_2H_4$ by weight, corresponding to about 52.8% of the hydrazine originally present. The temperature was then slowly raised to 66° C. with recovery of additional hydrazine, but of somewhat lower $N_2H_4$ content. This second fraction of distillate, comprising some 81.2 parts by weight, was found to contain 97.3% hydrazine. After about 188.6 parts of distillate had been collected the temperature of the still rose rapidly, indicating that the hydrazine-rich phase of liquid had been substantially removed. When the temperature reached 87° C., 6.7 parts more of distillate had been obtained with a hydrazine concentration of 93.7%. On combining these fractions of distillate it was found that an overall recovery of hydrazine amounted to about 95.4% of that originally present, with the solution having a concentration of hydrazine of about 97.7%.

Example II

To 600 parts of 42.5% $N_2H_4.H_2O$, containing 27.2% by weight of hydrazine, in a still there was added 1335 parts of 97% caustic soda equivalent to about 1295 parts of 100% sodium hydroxide. This represents a one-to-one molecular ratio between the caustic and the water. Here again, total recovery of hydrazine amounted to approximately 99.7%, consisting of 2 fractions, the first of which amounted to 200 parts and was obtained by distillation at 72°–76° C. under a reduced pressure of about 150 mm. and contained about 88.0% of the hydrazine originally present, the concentration of hydrazine in this fraction being about 95.80%. The second fraction of 35 parts was obtained by slowly raising the temperature to 80° C. This second fraction was of lower hydrazine content, namely about 73.04% by weight and represented about 11.7% of the hydrazine originally present. This last fraction of low concentration may be either reprocessed with sodium hydroxide in accordance with the procedure set forth in the foregoing, or may be used for purposes requiring lower concentrations of hydrazine.

Example III

One hundred parts by weight of a solution assaying 85% by weight of hydrazine hydrate (containing 54.4% $N_2H_4$) was treated with 113 parts of NaOH (100% caustic soda) and the temperature of the mixture raised to 70° C. with agitation. Nearly all of the caustic soda went into solution. Upon becoming aquiescent, two liquid phases were formed, the upper phase containing about 90–92% $N_2H_4$, the lower phase only 6–7% $N_2H_4$. The lower phase including a liberal interface was siphoned off and the upper phase separately distilled to give a vapor which upon condensation yielded between 43–45 parts by weight of substantially anhydrous hydrazine.

Example IV

In another example the same proportions of hydrazine hydrate (85%) and caustic soda were employed as in Example III. Separation into two liquid phases occurred as previously indicated. This mixture was distilled under reduced pressure from 76° C. to 78° C. directly without prior mechanical separation, until the upper phase had disappeared completely. No further distillate could then be obtained except by raising the temperature or reducing the pressure. It was found, however, that distillation, when interrupted at this point, brought about the removal of some 45 parts by weight of substantially anhydrous hydrazine constituting some 82% by weight of the hydrazine originally present. Additional fractions of hydrazine-rich material, but with higher water content, were obtainable by raising temperature of the residual liquor.

Example V

Using quantities and conditions essentially the same as given in Example IV to effect separation of the two liquid phases except that the reaction vessel was fitted with a column to permit rectification of the vapors, there was obtained a distillate consisting of substantially anhydrous hydrazine (51.2 parts by weight) and containing 99.8% $N_2H_4$ by analysis. Use of a column both for rectification of the vapor during removal of the upper phase, followed by subsequent rise in temperature to permit further removal of hydrazine vapor, thus makes possible substantially complete recovery of all the hydrazine as material of exceptional purity.

From the foregoing description it should be apparent that the present invention accomplishes its objects, and provides an economical process for producing substantially anhydrous hydrazine from dilute solutions of hydrazine hydrate without requiring preliminary concentration of the hydrazine hydrate solutions, and without requiring time-consuming refluxing operations or long cooking periods prior to the beginning of distillation. Although rather specific conditions for effecting the operation of the process in accordance with this invention are set forth in the foregoing examples, it is to be understood that the invention is not limited to the exact temperatures nor to the exact quantities of ingredients or other details set forth in these illustrative examples, save as indicated by the appended claims.

Having thus described the invention, what is claimed and desired to be secured by Letters Patent is:

1. The process of preparing substantially anhydrous hydrazine which comprises intermixing caustic soda and an aqueous hydrazine solution in the proportion of at least one mole of caustic soda for each mole of water present, heating the mixture to a temperature in the range of about 60° C. to 80° C., allowing the mixture to become substantially quiescent and to stratify, mechanically separating the resulting two layers of liquid, and distilling the hydrazine from the solution of the upper layer.

2. The process of preparing substantially anhydrous hydrazine which comprises intermixing an aqueous hydrazine solution and an amount of sodium hydroxide approximately sufficient to form sodium hydroxide monohydrate with all the water present in the solution, maintaining the temperature of the mixture between 60° C. and 100° C. to effect separation of the mixture into a hydrazine-rich phase and a hydrazine-lean phase, reducing the pressure on the mixture below atmospheric to vaporize the hydrazine-rich phase at a temperature in the range between 60° C. and 80° C., and collecting and condensing the vapor given off by said mixture.

3. In the manufacture of hydrazine, the process of dehydration comprising, contacting hydrazine hydrate with sodium hydroxide at temperature in the range of 60–100° C. until the mixture is substantially quiescent it stratifies into an upper hydrazine-rich layer and a lower hydrazine-lean layer, and separating the hydrazine-rich increment from the other.

4. In the manufacture of hydrazine, the process comprising, providing a dilute solution of hydrazine hydrate having a known water content, contacting the dilute solution with sodium hydroxide in the proportions of at least one mole of sodium hydroxide for each mole of water desired to be removed from the hydrazine, maintaining the temperature of the mixture in the range of 60–100° C., allowing the mixture to become substantially quiescent and stratify into layers, and separating the layers.

5. In the manufacture of hydrazine, the process comprising, providing a dilute solution of hydrazine hydrate having a known water content, contacting the dilute solution with sodium hydroxide in the proportions of at least one mole of sodium hydroxide for each mole of water desired to be removed from the hydrazine, maintaining the temperature between 60° C. and 100° C. to effect separation of the mixture into a hydrazine-rich phase and a hydrazine-lean phase, and controlling the pressure on the mixture so as to distill within said temperature range.

6. In the manufacture of hydrazine, the process comprising, providing a dilute solution of hydrazine hydrate having a known water content, contacting the dilute solution with sodium hydroxide in the proportions of at least one mole of sodium hydroxide for each mole of water desired to be removed from the hydrazine, maintaining the temperature in the range of 60–100° C. until the mixture is substantially quiescent and liquid phase separation occurs, and reducing the pressure on the mixture to distill at temperatures between 60° C. and 80° C.

References Cited in the file of this patent

J. W. Mellor's "A Comprehensive Treatise on Inorganic and Theoretical Chemistry," vol. 8, 1928 ed., pages 310, 311. Longmans, Green and Co., N. Y.

Journal of Amer. Chem. Society, vol. 33, pages 1071–1076, article by Hale and Shatterly.